Jan. 5, 1943.  C. H. BOND  2,307,353
ELEVATOR
Filed Dec. 13, 1940   6 Sheets-Sheet 1

Inventor.
Clinton H. Bond.
By G. C. Kennedy
Attorney.

Jan. 5, 1943. C. H. BOND 2,307,353
ELEVATOR
Filed Dec. 13, 1940 6 Sheets-Sheet 3

Inventor.
Clinton H. Bond.
By G. C. Kennedy
Attorney

Jan. 5, 1943.  C. H. BOND  2,307,353
ELEVATOR
Filed Dec. 13, 1940  6 Sheets-Sheet 4

Inventor
Clinton H. Bond,
By G. C. Kennedy
Attorney

Jan. 5, 1943. C. H. BOND 2,307,353
ELEVATOR
Filed Dec. 13, 1940 6 Sheets-Sheet 5

Inventor.
Clinton H. Bond,
By G.C.Kennedy
Attorney.

Jan. 5, 1943.                    C. H. BOND                    2,307,353
                                  ELEVATOR
                           Filed Dec. 13, 1940            6 Sheets-Sheet 6

Inventor
Clinton H. Bond.
By G. C. Kennedy
Attorney

Patented Jan. 5, 1943

2,307,353

UNITED STATES PATENT OFFICE 2,307,353

ELEVATOR

Clinton H. Bond, Cedar Falls, Iowa, assignor to The Wagner Manufacturing Company, Cedar Falls, Iowa Application December 13, 1940, Serial No. 369,963

7 Claims. (Cl. 187—31)

My invention relates to improvements in elevators and their mechanisms, including electric circuits therefor.

A principal object of my improvements is to employ means for insuring safety of the passengers within a car, or when entering or leaving it, and in preventing injury to a passenger while endeavoring to enter or leave the car while in motion.

Another object of my improvements is to place all of the mechanisms and circuits under the full control of the operator at all times, and by electrically controlled means especially contrived for use in case of emergencies.

One object of my improvements is to include an electric motor in a circuit, and associated with adjustable oppositely movable and linked devices for controlling the braking of the car at times, releasably.

Another object of my improvements is in supplying associated devices for stepping down the speed of the motor, with other means including a plurality of dash-pots for dampening jars incident to the to and fro actions of the motor connections during its reciprocations of their linked elements.

Another object of my improvements is the combination of offset car and shaft doors, whether in a single cooperating pair for opposite shifting, or in two sets of pairs for like purposes, as desired, and in both of which pairs or sets certain of the pairs travel to and fro at differing speeds, conducive to the safety of car occupants, or when entering or leaving the car.

Other improvements will be shown and described herein, and it is to be understood that various modifications may be employed without departure from the scope of the invention to be defined in the claims.

The different features of my invention are depicted in the appended drawings, in which:

Figs. 13 to 16 inclusive are enlarged detail views of certain subordinate devices of my invention, described as follows.

Figures 1, 3:
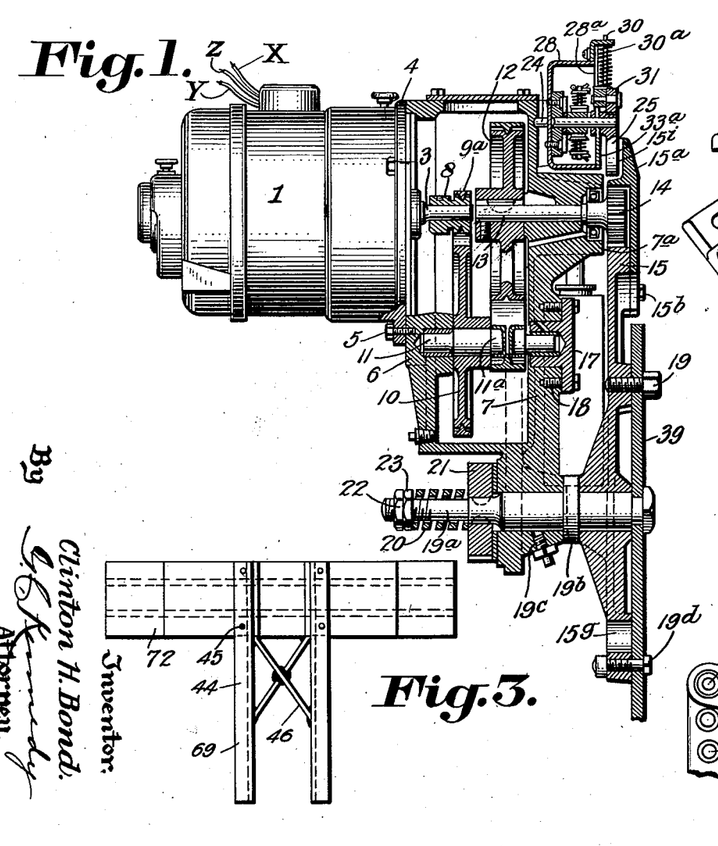
Figure 1 is a view, partially in side elevation and in longitudinal section, of the electric motor and its accessories, with parts broken away.
Fig. 3 is a top plan of a frame device positioned above the car.
Figure 2:
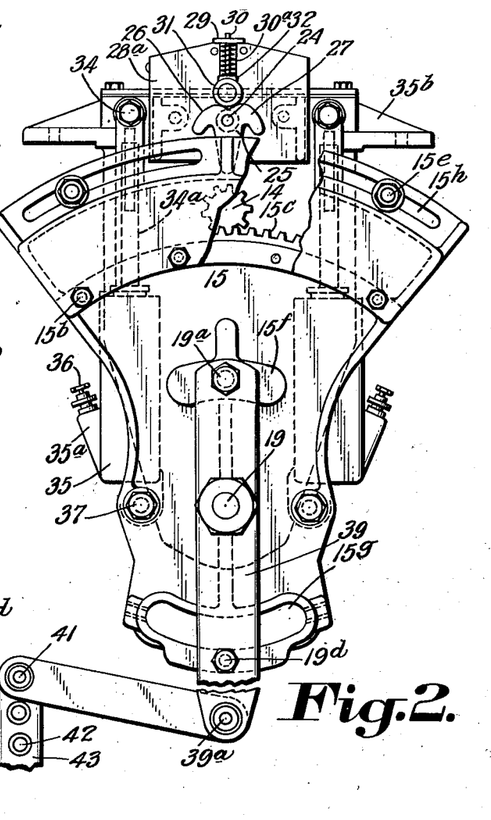
Fig. 2 is a front elevation of the above, also with parts broken away.
Figures 13, 14, 15, 17, 18:
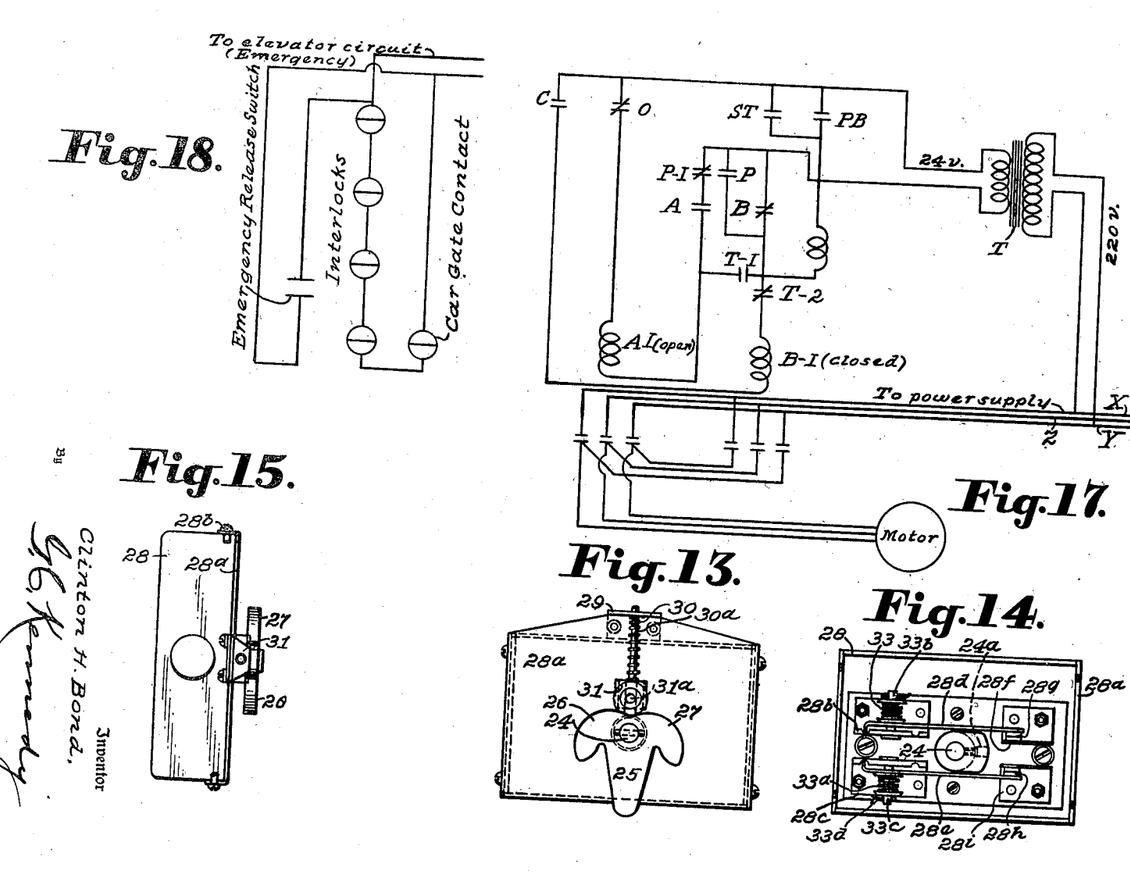
Fig. 13 is an elevation of a housing member mounted on a body frame carrying an electric motor.
Fig. 14 is a top plan of said housing member with top removed.
Fig. 15 is a side elevation of the housing shown in Fig. 13.
Fig. 17 is a diagram of the motor circuit.
Fig. 18 is a partial diagram of the circuit having a plurality of openable electric contacts alined therein.

Referring to Figs. 1 and 2, the numeral 1 denotes a rotary motor which has wiring terminals $x$, $y$ and $z$ leading in a circuit as shown in Fig. 17. The motor shaft 3 traverses a bearing seat in a face-plate 4 of the motor, and a small belt-wheel 9 is secured on a stem 8 secured on the shaft 3. A supporting frame body 6 is secured by screws 5 to a rim of said face-plate 4. Between parts of said frame 6 are sockets therein seating the ends of a shaft 11 carrying a relatively large diameter belt-wheel 10. A T-belt 9a is reeved on the wheels 9 and 10. A small belt-wheel 11a is on an enlarged part of the shaft 11. A shaft 13 is mounted in the frame part 7, and carries thereon a belt-wheel 12, and a belt is reeved around the wheels 11a and 12. The frame part 7a is apertured to seat therethrough a shaft 13 carrying on its outer end part a relatively small spur-gear 14. The right-hand end part of the shaft 11 is seated in a cupped removable cap 17 secured to the frame 7 by screws 18.

The frame 7 projects downwardly, and its lower part is transversely bored as a seat for a transverse shaft 19 fixed therein removably. The left-hand part of the shaft 19 is diminished in diameter at 19a, has seated thereon a washer 21a, a thicker washer or nut 21 extending outwardly and is terminally threaded to seat two nuts 22 and 23 thereon, with a compression spiral spring 20 between the said nuts and the first-mentioned nut 21. A threaded plug 19c is seated in a threaded hole in the frame for permitting lubrication. A band ring 19b is mounted as a spacer on the shaft 19 which projects forwardly through a rocker body 15, and carries on its outer end a bar 39 which is medially pivoted, with a securing end nut.

The rocker body 15 is widened at the top with the upper marginal edge being curved, and an arcuate plate 15a is removably secured by bolts 15b in its lower part upon the body 15 to extend a short distance thereabove, with the extended part having equal length arcuate slots 15c therein traversed by bolts 15d and 15e in each case having end nuts thereon, whereby when the bolts are adjusted along the slots 15c and 15h respectively, the nuts may be turned to secure the bolts in place for variations of their positions.

The curvate part 15a has an arcuate depression seating the spur gear 14 therein to mesh with teeth 15c as shown in Fig. 2, for rocking the segment 15a together with the depending member 15 to and fro a limited distance in a medial curvate path. The lower rock body part 15 is rockably mounted on the transverse shaft 19, and there is a bolt and nut connection at 19d between the elements 15 and the depending part of the bar 39. Just above the connection 19d the lower part of the member 15 has an arcuate slot 15g, with screw seats 38 at its ends, to seat screws at times. In the lower end of the bar 39 is a pivotal connection 39a with one end of an arm 40.

An upper offset part 7a of the body 7 serves as a supporting base for a casing 28 mounted therein by basal screws, removably. The casing 28 is positioned in an upwardly opening seat between oppositely directed side lugs 35b (see Fig. 2), which are apertured vertically as shown by dotted lines, and on the side parts of the frame 7 in the rear wall thereof are mounted, as shown by full and dotted lines, a like spaced pair of vertical tanks 35 having filler tubes 35a, capped at 36, to receive liquid contents such as oil, to serve as oil check cylinders. On pivots 34 are hung depending stems 34a with plunger heads movable in said tanks or cylinders 35, to prevent jarring.

Referring to Figs. 1, 2, and particularly Figs. 13 to 16, respectively, the casing 28 hereinbefore alluded to, has a face-plate 28a secured thereto by screws 28b through side flanges. A forwardly bent riser 29 is secured by screws to the upper projecting part of the front plate 28a. A stem 30a traverses a bearing hole in said riser being loosely seated therein. The upper end of the stem carries a compression coiled spring 30a around it. Spring 30 bears at its lower end upon a bifurcated head fixed on the lower end of the stem. A pintle 31a rotatably seats in the bifurcations and has a roller 31 thereon. A rock-shaft 24 traverses medial apertured seats in the front and rear walls of said casing (see Figs. 13 and 15), and a tripartite arm device is fixed on the forward end of said shaft to depend vertically downwardly.

The tripartite arm or member referred to has a medial depending angular finger 25 with like but relatively reversed lateral like curvilinearly downwardly directed terminations with curvate outer edges as shown in Fig. 13, these curvate edges medially of the device being joined at an angular depression. This axis of the device lies closely below the roller 31 which rides rockingly to and fro on the members 26 and 27, the roller being seated in the reentrant angle between the side members when the member 25 is in a vertical position, where it is yieldingly held by the spring 30 acting on the roller.

Figures 4, 5, 5A, 16:
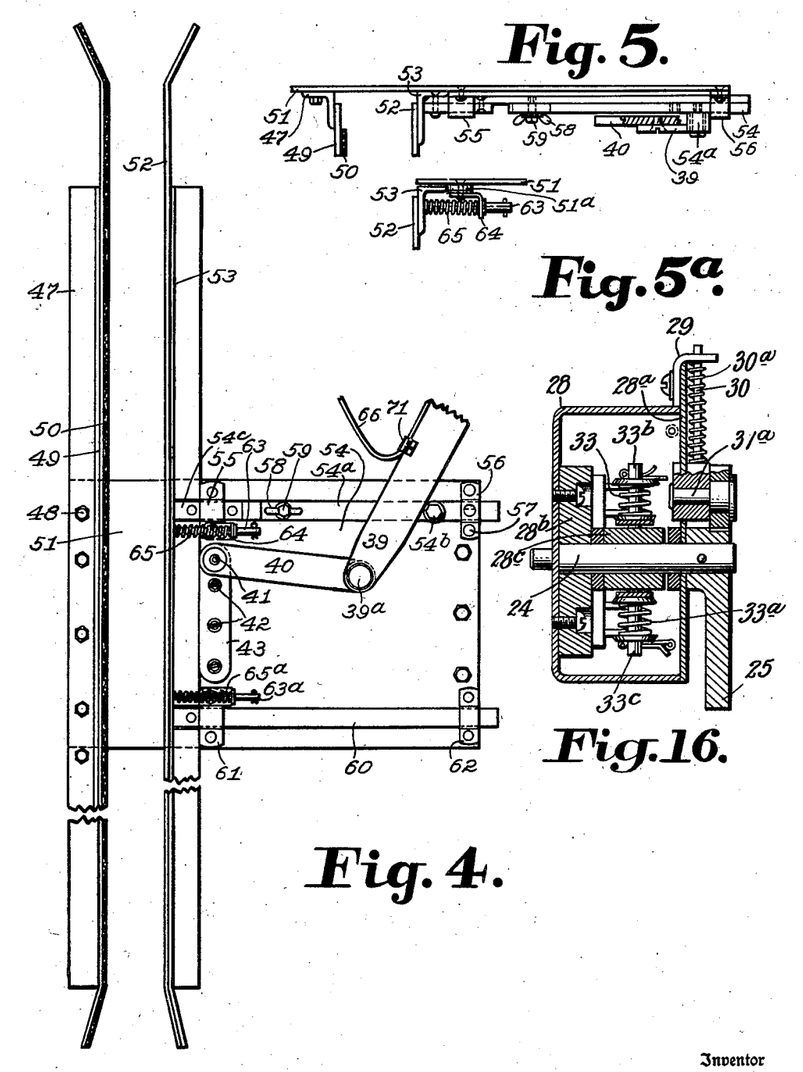
Fig. 4 is an enlarged elevation of a vertical pair of spaced rails and showing linked connections to one rail as associated with said electric motor, parts being broken away.
Fig. 5 is a fragmental top plan of frame elements shown in Fig. 4, with parts in section.
Fig. 5a is a top plan of one of the coiled springs bearing against the movable rail aforesaid.
Fig. 16 is a vertical cross section thereof.

Fig. 14 shows the casing 28 with the front cover removed. The shaft 24 has its forward end seated rotatably in an adjustable apertured body having an adjusting pin 24a. Medially spaced angle-bars in pairs transversely spaced apart and spaced from each other, as at 28b and 28c, 28f and 28i are bolted upon the inner rear face of said casing. Like but reversed resilient bars 28d and 28e are positioned in parallel relationship in the casing 28 and are spaced from the upper and lower faces of the flanges of the angle-bars, the left-hand end parts of the resilient bars being seated in depressions of the flanges. The right-hand end parts of the resilient bars 28d and 28e are spaced from the flanges of the angle-bars, with blocking members engaged therebetween. Headed pins 33b and 33c with heads adjacent to each other traverse apertures in the resilient bars 28d and 28e, with coiled compression springs contacting at one end with said bars, and preferably with washers contacting with the opposite ends of the springs, the remote ends of the pins being apertured to seat therethrough split-keys as at 23. Fig. 16 shows in left-hand elevation and section equivalent features of some of the elements shown in Fig. 14. Fig. 15 is a top plan of the casing and its front plate or cover 28—28a, showing for convenience, an end cap 29 therefor permitting inspection of the interior.

Figures 11, 12:
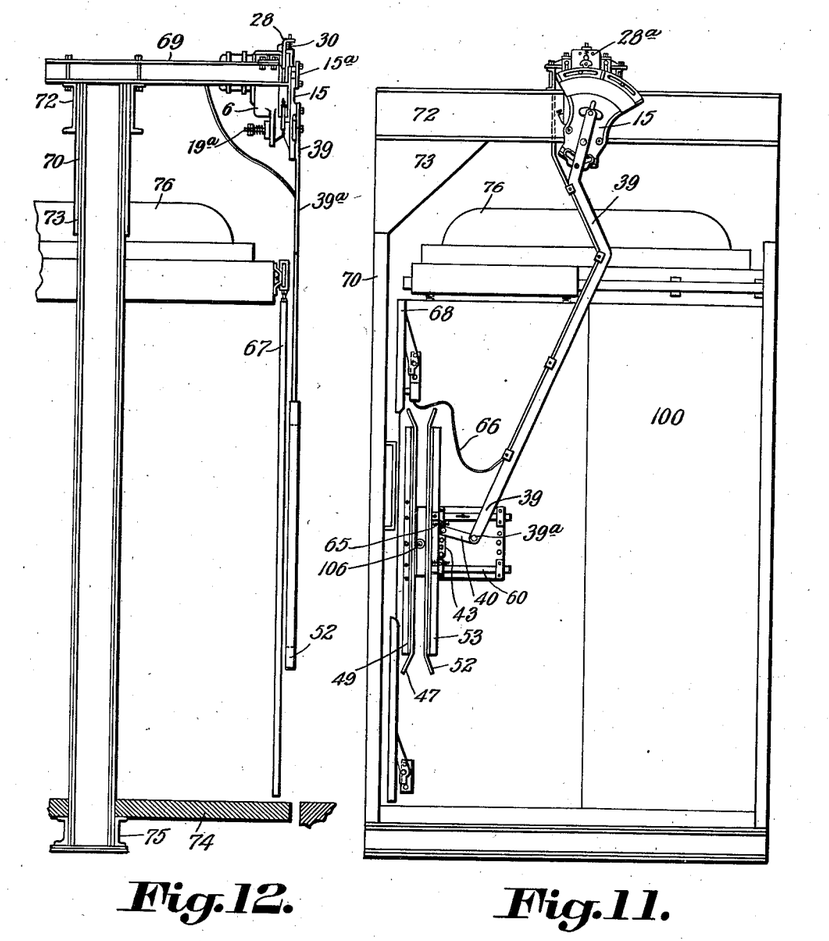
Fig. 11 is an elevation of an open outer frame and of a car positioned therein carrying the reciprocatory member mounted on the motor, with connections to one of said pair of fixed and movable rails in relative adjustment.
Fig. 12 is a side elevation of the structures shown in said Fig. 11, with parts broken away.

Referring again to the rocker element members 25 to 27, it will be seen that in Figs. 1 and 2 is shown a recess 15i in Fig. 1, into which depends rockingly for loose contact the medial tongue part 25, which is rockable to and fro, and acts to produce like movements in the rock members 15a and 15, limited by adjusting bolts 15d and 15e. The lateral like but relatively reversed side members 26 and 27 act as cams as the roller 31 rides thereover under the light compression of the spring 30. It will be seen that at either of the terminal movements of said members, as adjusted by the bolts 15d and 15e, the action of the spring 30 will cause a rocking return movement of the device into its medial depending position when the rocking action ceases. In this way the combined members 15a and 15 are rocked together to and fro during the action of the pinion 14 in likewise rocking to and fro, to alternately reverse the rocking of the rotor in the housing 1, while the electric circuit shown in Figs. 17 and 18 is closed, and when the circuit is open, the driven members hereinbefore mentioned are returned to their initial medial positions. The incased devices within the housing 28 act as auxiliary controlling means in stabilizing movements of the combined rock bodies 15 and 15a, and of the medially pivoted rock-arm 39 with its connecting means at 41 to one or the other of pin sockets 42 in the linking member 43, as is also shown in Fig. 4, where screw plugs are shown. In Fig. 11 is shown an equivalent connecting means between the rocker member 39 at the top and the rock body 15, being an offset arm as shown.

The numeral 67 denotes a slidable door for the open front of an elevator car 76 in which car is movably seated an outer slidable door 100, termed a shaft door. These relatively slidable doors have mounted on their opposed inner faces certain fixed and movable contrivances, to be hereinafter described, and shown on a reduced scale in Fig. 11. Fig. 4 shows on a larger scale certain contrivances or movable and fixed associated elements, as follows. The bar link 40 has its outer end pivoted at 41 in one of the sockets in a fixed bar 43, and usually in the uppermost socket, the other sockets having screw closures 42 therein for adjusted connection to the bar 43 as desired. Adjacent to one leg of a vertical angle bar 53 (see Fig. 4), and on a rectangular plate 54 is secured at each of the upper and lower edges like bars 54a and 60 seated in brackets shown at 55, 56, 61 and 62. The plate 54 is secured to the inner or car door 67. Vertically spaced bracket arms 64 are fixed on the brackets 55 and 61 and are supported loosely by fixed pins 63 and 63a respectively. Coiled compression springs 65 and 65a are mounted upon pins 63 and 63a. The numeral 47 denotes a vertical angle bar fixed by bolts 48 on the said door 67. A flat vertical bar 49 is secured to one flange of the angle bar 47, and has a longitudinal strip 50 of slightly yieldable roughened material secured on the right-hand face thereof. The movable bar 52—53 is spaced parallel to the fixed bar 49 and is normally retained by the springs 65 and 65a at its outer limit of travel. The bars 54a and 60 have bolt and nut connections to the plate 54 at 58—59. The above described connections and their supports are shown in superposed relation in Figs. 5 and 5a. Fig. 11 shows a metallic skeleton open housing or frame with vertical transversely spaced standards 70 secured at their lower ends between flanged members 75 fixed below and in contact with a flooring 74. The upper ends of the standards are fixed to and between horizontal flanged bars 69 and 72 by bolts traversing the flanges of the bars 72 and 69. Upon the forward face of the forward angle bar 72 is medially mounted between the side bars 69 the electrically controlled motor 1 and its associated fixed and movable contrivances shown in Figs. 1 and 2.

Figure 9:
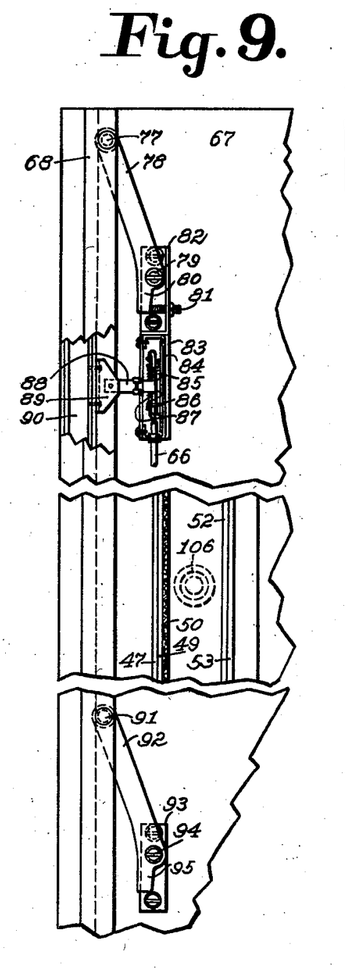
Fig. 9 is an elevation of one face of a door of this invention, with parts broken away or removed, showing braking means thereon, and damping means mounted movably on the door and having a flexible connecting element connected to a rockable arm on the reciprocatory element shown in Fig. 2.

Referring to Figs. 4 and 9: In Fig. 9 is shown the door 67 a vertically spaced pair of like arms 78 and 92 respectively pivoted their upper ends on studs 77 and 91, with the lower end parts slightly deflected to the right vertically. The lower part of the upper arm 78 has a diminished termination 80, and just above this the arm is pivoted at 79 to a bar 82, flanged at one side and having its base secured to the door by screws. A headless screw 81 traverses the longitudinal flange and end-engages the finger 80 adjustably. In depending alinement below the angle-bar 82 is a channel bar 83. A liner plate device 84 abutting the angle-bar has fixed thereon spaced angle members 85 and 86 connected by a rod, and coiled springs 87 are engaged between the angle members, between which members and springs a fixed arm 88 projects to the left and has a terminal angled head 89 secured to a channel bar 90. The member 83 is linked to the upper end of a flexible wire rod 66 whose lower end is passed through a fixed loop 71 on the member 39. The wire rod or member 66 has its upper end secured to the channel bar 72 after traversing the loops spaced along the arm 39. The swingable arm 92 (Fig. 9) and connections pivoted at the top at 91 and at 94 to a plate 93 are like the upper arm devices at 77 and 78, and maintain them both in vertical alinement, while the springs 87 brake the end movements of the arm 39.

Figures 6, 7:
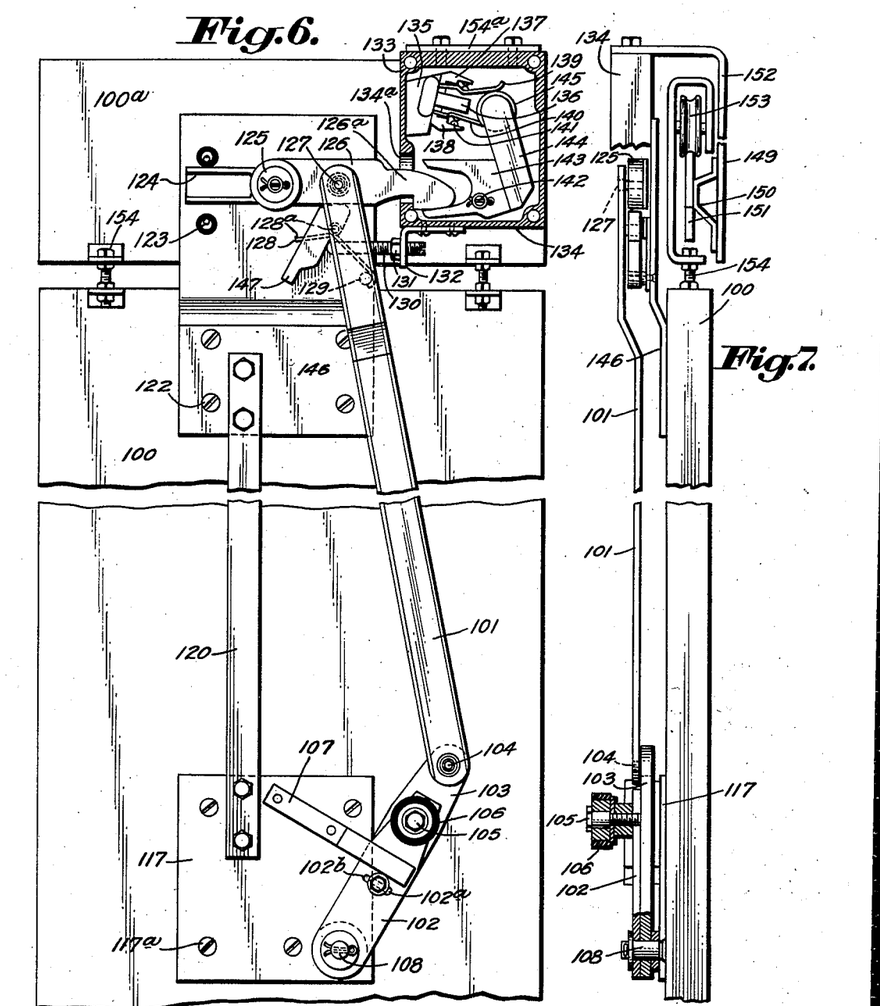
Fig. 6 shows a vertical plane member on which is mounted a braking stop adapted to be positioned between the fixed and movable parallel rails thereon, the figure including a make-and-break device operatively linked to jointed rock members, of which one member has said braking stop thereon.
Fig. 7 is a vertical edge elevation of the elements shown in said Fig. 6, with parts broken away.
Figure 8:
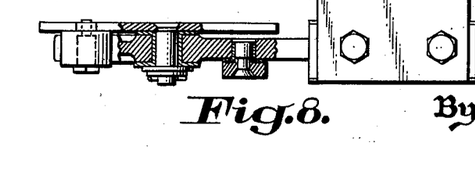
Fig. 8 is a fragmentary top plan, in partial section, of the elements shown in said Fig. 6.
Figure 10:
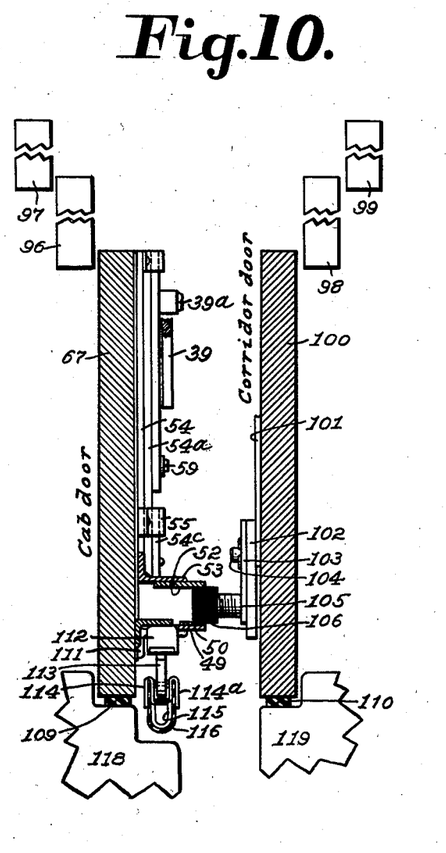
Fig. 10 is a horizontal cross section of the spaced parallel car and corridor doors, including a braking device on the latter, and also showing upper parts of other elements as partially broken away, being parts of pairs of slidable doors without said elements, the view including also relatively fixed frame parts with buffers thereon and cushioned to receive impacts thereon of said doors.

Referring now to Figs. 6, 7, 8 and 10, and particularly to Fig. 10: in the latter are shown the opposite spaced parallel car and shaft doors 67 and 100 as seen from above and both in horizontal section. On the face of the car door 67, in top plan, are shown certain related members displayed on Fig. 11 and already described herein, including in cross section the members 49 and 53, relatively fixed and movable. On the opposed shaft door (100), and shown in Figs. 6, 7 and 8, are certain members, including an offset plate 146 projecting above the top of the door 100 and on which is mounted a casing 134 having a side slot 134a. Within this casing is a bifurcated body 143 opposite said slot 134a and rockable upon a pivot 142. The body 143 has an angularly directed arm 144 carrying a roller 145 on its remote end. Also within said casing above said slot is a fixed bracket 135 carrying a medial projection 136. Like but reversed pointed and relatively offset projections 137 and 138 are on the bracket 135 and both spaced from the projection 136. Like but spaced spring fingers 139 and 140, bent away from each other, are fixed on the part 135 with small coiled springs 141 bearing against the fingers.

An arm 124—126 has a medial boss 125 pivoted on the offset upper portion of the plate 146 with the left-hand channeled portion of the arm positioned between a pair of rubber sleeved pins 123 and rockable to or from either pin. The opposite part of the arm at 126 has a terminal hook 126a which as shown in Fig. 6 traverses the slot 134a in the casing 134 in a lowered position and has its end hook lockably engaged with the casing part below. In this position, the hook depresses the lower finger of the part 143, causing the rocking of the rigid arm 144 to force the roller 145 between the spring terminals 139 and 140.

Spaced beneath the plate 121 is a flat plate 117 secured by screws 117a to the lower part of the door 100 below the offset upper plate 121. A bar 120 may (or not be) secured at its opposite ends by screws or other means to and between said plates.

A rock arm 103 has its lower end pivoted at 108 to the lower right-hand corner part of the plate 117, and a shorter arm 102 is also pivoted on the same pivot as the arm 103, and secured to the latter by a screw 102a. The arm 102 has at its outer end an interiorly threaded boss to seat thereon a rotatable and preferably rubber-covered cylindrical head 106. An offset arm 101 has its lower end pivoted at 104 to the outer end of the rockable arm 103 and extends upwardly therefrom. The two arms 101 and 103 are always directed to the right at their pivotal connection relative to each other. The upper end of the arm 101 is pivoted at 127 to the arm part 126. On the rear face of the upper part of the arm 101 is a stud 129 to which is anchored an end of a resilient rod 128, which is medially coiled on a stud 128a on the arm 147, the latter being rockable thereon, and tending to yieldingly and normally keep the arm 101 in its remote position to the right, as shown in Fig. 6. A resilient offset bar 107 secured on the plate 117 crosses and serves to brake the movements of the arm part 102.

Fig. 7 shows a side elevation of the door 100. A pair of screw hangers 154 on the upper end of the door 100 carry a C-shaped tubular member 152 within which is rotatably pivoted a channeled wheel 153 ridable along a rail 151 bracketed at 150 to the depending end of a hanger 154a. By this means the door 100 may be shifted horizontally.

In Fig. 10 is shown in horizontal cross section the car door 67 and the shaft door 100 spaced in parallel relationship. The roller 106 (as shown in Fig. 7 and in Fig. 6), is shown between the fixed and movable angle-bars 49—50 and 53, in contact therewith. The numerals 118 and 119 denote spaced stepped moldings, spaced apart rigidly, and having fixed on opposite steps thereof rubber pads 109 and 110 respectively. These pads prevent clashing and noise during the operation of the doors at a limit of travel. Referring to Fig. 10 again; a supporting member 112 is mounted on the cab door 67 when desired, and has a rigid arm 113 spaced parallel and apart from the door, and cross-connected loops of metal 114 and 114a together with said arm 113 are traversed by a securing pin. A single loop 115 of metal is secured to and projects in alinement from the associated parts 114 and 114a, and is covered by a yieldable flexible cover 116 of U-shape whose terminations are also secured between the parts 114 and 114a. This device projects a short distance beyond and in alinement with the supporting means 112 and 113, serves as a resilient buffer beyond the edge of the door 67 and is adapted to push away a person trying to slip into or out of the car without injury.

When the parallel doors 67 and 100 are associated by means of the engaging elements 53—49 having the rubber covered roller 106 grasped between them, the pair of doors may be shifted horizontally together. The doors are disengaged by the motion of the car up and down, thereby removing element 105 from between elements 49—53. In Fig. 10, additional or auxiliary offset pairs of doors 96—97 and 98—99 may be supplied for horizontal movement together or in conjunction with the pairs of doors 67 and 100, without departing from the invention herein.

Fig. 17 is an electric diagram including a reversible electric motor and conductors with make-and-break devices in the circuit, and leads to a power supply not shown. Figs. 1 and 2 show the leads to and from the motor as broken away. The diagram is explained as follows: The connections and contacts are as shown when the car is moving with door closed. The operation is explained as follows.

The contacts A and B on the elevator controller are to be mechanically interlocked. The contacts A close, and the contacts B open when the car comes to a full stop deenergizing the coil B—1. The limit switch contacts O open when the doors are fully open. The contacts B close, and the contacts A open when the button is pressed, energizing coils B—1 to close the doors. The limit switch contacts C open when the doors are fully closed. The car must not leave the floor until the gate contact is closed. The closing of contacts ST connected to the safety stile completes the circuit through time relay TR, which breaks the contact T—2, which stops the closing of the doors and closes contacts T—1, which energizes the coil A—1, and which opens the doors again. After a time interval of approximately fifteen seconds the time relay closes contacts T—2 and opens contacts T—1 allowing the doors to close. The push button PB, located in the car, operates the same way as the safety stile.

Symbols

A—On elevator controller. Normally open when the car is moving.
B—On elevator controller. Normally closed when the car is moving.
PB—Push button for emergency opening—when doors are closing.
T—1—Normally open contact on TR relay.
T—2—Normally closed contact on TR relay.
O—Opening limit switch.
C—Closed limit switch.
A—1; B—1—Reversing relay for safety stile operator.
ST—Contacts on safety edge.
P; P—1—Contacts on parking switch (Parking switch consists of three-pole Corbin keyed switch).

Cab circuit

Fig. 18 is a diagram of a car circuit, having a car gate contact and an emergency release switch E, together with a plurality of ordinarily open contacts in number equal to the floors of a building. This circuit F provides a make-and-break contact at each floor. In the event that the car cable becomes entangled between floors, the operator at the interlock thereof between floors may close a contact there, as shown in Fig. 18 in the elevator emergency car circuit, whereby the cable is released from the impediment.

I claim:

1. The combination with an open front elevator car mounted for vertical movements, of door closures therefor, relatively spaced and offset from each other, a vertical pair of parallel spaced bars abutting the outer face of the inner closure with one bar mixed thereon and the other bar mounted on the face in movable contact therewith and for horizontal movement toward and from the fixed bar, a laterally movable single projection having a rotatable cylindric head on the inner face of the outer closure and adapted to extend between the bars in spaced relation thereto, a swingable device extending into the interspace of the closures and terminally linked to the movable bar, whereby when the device is rocked in one direction said movable bar and fixed bar contact opposite sides of said cylindric head, and when said device is rocked oppositely the projection is freed from said contacts and means mounted on the outer closure for releasably locking the swingable device thereto.

2. The combination with an open front elevator car mounted for vertical movements, of door closures therefor, relatively spaced and offset from each other, a vertical pair of parallel spaced bars abutting the outer face of the inner closure with one bar fixed thereon and the other bar mounted on the face in movable contact therewith and for horizontal movement toward and from the fixed bar, a laterally movable single roller device mounted on the inner face of the outer closure and adapted to extend normally loosely between the bars in spaced relation thereto, and a swingable reversing motor device having a pivoted and swingable connection with the movable bar device to contact the single roller with and between said bars releasably.

3. The combination with an open front elevator car mounted for vertical movement and for halting its movement at determined stages, of door closures relatively spaced and one offset from the other for lateral movement, a vertical pair of parallel spaced bars abutting the outer face of the inner closure with one bar fixed thereon and the other bar mounted on the same face in movable contact therewith and for horizontal movement toward and from the fixed bar, a roller device having an elastic tread and mounted on the inner face of the outer closure and adapted to extend between the bars in spaced relation thereto, and means for releasably engaging the roller with said bars consisting of a swingable arm, means for limitedly swinging the arm, a link having one end pivoted to one end of said arm and having its other end adjustably pivotally connected to the movable offset door closure.

4. The combination with an open front elevator car mounted for vertical movement, of a pair of spaced parallel car and shaft doors mounted slidably on the car with separable connections between their opposed inwardly directed faces, and a buffer bracket with a resilient head mounted on the forward inner part of the car door parallel therewith and projecting beyond the front edge of said door.

5. The combination with an open front elevator car, of a pair of spaced parallel car and shaft doors positioned at the open front of the car, with the car door shiftable horizontally, parallel spaced vertical bars positioned on the car door, one bar being fixed thereon and the other bar removable to and from the first bar limitedly, spaced resilient devices mounted on the first door to bear against said movable bar adjustably, a rock arm mounted on the first door pivotally and adjustably, a swingable arm on the rock arm, mechanism mounted on the car and linked to the swingable arm rockably, a rock arm mounted on the inner face of the shaft door, means on said door for limiting the swing of the rock arm in one direction, and a roller mounted on the rock arm and extending between said fixed and movable bars for either loose or engaging contacts.

6. The combination with an open front elevator car, of spaced relatively slidable doors therefor, an electric motor mounted fixedly on the car, a frame device rigidly bracketed on the motor housing, coacting step-down devices in train with the motor shaft including a toothed pinion, a rock-body mounted on the frame device for adjustable rocking movement, the rock-body having arcuately arranged teeth thereon in mesh with said pinion, an arm limitedly rockably adjusted on the rock-body and secured thereto, linking bodies connected adjustably to the car door of the pair movably, means on the shaft door of the pair for releasably connecting the latter door to the former door, a tripartite member limitedly adjustably rockably mounted on said frame and positioned medially thereon, a spring controlled roller on the frame to ride upon and along the upper and medially indented parabolic edges of the side parts of the tripartite member as the latter rocks to and fro, and the medial angular part of the member being rocked by the rock body, the electric circuit containing make-and-break devices and in communication with said motor, and with a source of power supply.

7. In combination, a vertically movable elevator car, with an open front, oppositely spaced parallel car and shaft doors positioned for closing said open front, spaced vertical parallel bars mounted across the outer face of the car door, one bar being fixed thereon and the other movable to and from the fixed bar, the fixed bar having a cushioning strip fixed along its face opposite to the movable bar, resilient devices having their outer ends connected to the car door with their opposite ends bearing against said movable bar, mechanism for shifting said bars toward each other, controllable stop devices rockably and releasably lockably mounted on the rear face of the shaft door including a roller thereon movable to enter between said bars withdrawably when the bars are moved out of contact with the roller.

CLINTON H. BOND.